United States Patent
Becker et al.

(10) Patent No.: US 9,647,460 B2
(45) Date of Patent: May 9, 2017

(54) SYSTEM FOR THE INDUCTIVE CHARGING OF AN ENERGY ACCUMULATOR OF A VEHICLE, AND CHARGING STATION

(75) Inventors: Günter Becker, Östringen (DE); Dirk Degen, Bruchsal (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 1060 days.

(21) Appl. No.: 13/515,265

(22) PCT Filed: Nov. 3, 2010

(86) PCT No.: PCT/EP2010/006688
§ 371 (c)(1),
(2), (4) Date: Jun. 11, 2012

(87) PCT Pub. No.: WO2011/069583
PCT Pub. Date: Jun. 16, 2011

(65) Prior Publication Data
US 2012/0256586 A1 Oct. 11, 2012

(30) Foreign Application Priority Data
Dec. 9, 2009 (DE) .................... 10 2009 057 437

(51) Int. Cl.
*H02J 7/00* (2006.01)
*H02J 5/00* (2016.01)
*B60L 11/18* (2006.01)
*H02J 1/00* (2006.01)

(52) U.S. Cl.
CPC ............. *H02J 5/005* (2013.01); *B60L 11/182* (2013.01); *B60L 11/1824* (2013.01); *H02J 2001/008* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/14* (2013.01)

(58) Field of Classification Search
CPC .. H02J 2001/008; Y02T 90/14; Y02T 90/122; H02G 9/10
USPC .................. 320/108, 109; 439/76.2; 174/50; 307/104
See application file for complete search history.

(56) References Cited

U.S. PATENT DOCUMENTS

| | | |
|---|---|---|
| 2,247,936 A | 7/1941 | Bishop |
| 2,300,408 A | 11/1942 | Deerwester |
| 4,118,861 A * | 10/1978 | Palmisano .................. 29/592.1 |

(Continued)

FOREIGN PATENT DOCUMENTS

| | | |
|---|---|---|
| DE | 203 03 320 | 5/2003 |
| DE | 20 2007 004293 | 6/2007 |

(Continued)

OTHER PUBLICATIONS

International Search Report and Written Opinion, issued in corresponding International Application No. PCT/EP2010/006688.

(Continued)

*Primary Examiner* — Robert Grant
(74) *Attorney, Agent, or Firm* — Andrews Kurth Kenyon LLP

(57) ABSTRACT

A system for the inductive charging of an energy accumulator of a vehicle, and a charging station, an electronic circuit being provided in the interior of a hood, the opening of which is situated at the bottom side of the hood.

26 Claims, 4 Drawing Sheets

(56) References Cited

U.S. PATENT DOCUMENTS

| | | | |
|---|---|---|---|
| 4,331,225 A * | 5/1982 | Bolger | 191/10 |
| 5,412,304 A | 5/1995 | Abbott | |
| 5,573,090 A | 11/1996 | Ross | |
| 6,243,274 B1 * | 6/2001 | Willis | 361/816 |
| 6,515,878 B1 | 2/2003 | Meins et al. | |
| 7,105,745 B2 * | 9/2006 | Drane et al. | 174/67 |
| 7,211,986 B1 * | 5/2007 | Flowerdew et al. | 320/108 |
| 2005/0272319 A1 * | 12/2005 | Schmidt et al. | 439/894 |
| 2007/0131505 A1 * | 6/2007 | Kim | 191/14 |
| 2008/0265684 A1 | 10/2008 | Farkas | |
| 2009/0160262 A1 * | 6/2009 | Schmidt et al. | 307/104 |
| 2012/0032525 A1 | 2/2012 | Oyobe et al. | |

FOREIGN PATENT DOCUMENTS

| | | | |
|---|---|---|---|
| DE | 698 36 468 | | 9/2007 |
| EP | 0 929 136 | | 7/1999 |
| JP | 2009-106136 | | 5/2009 |
| JP | 2009106136 | * | 5/2009 |
| WO | 94/09544 | | 4/1994 |
| WO | 2009/081126 | | 7/2009 |
| WO | 2009/133416 | | 11/2009 |

OTHER PUBLICATIONS

International Preliminary Report on Patentability and Written Opinion, issued in corresponding International Application No. PCT/EP2010/006688.

* cited by examiner

SYSTEM FOR THE INDUCTIVE CHARGING OF AN ENERGY ACCUMULATOR OF A VEHICLE, AND CHARGING STATION

FIELD OF THE INVENTION

The present invention relates to a system for the inductive charging of an energy accumulator of a vehicle, and a charging station.

BACKGROUND INFORMATION

It is conventional to equip vehicles with an electric motor that is able to be supplied with energy from an incorporated energy accumulator. For example, the energy accumulator must be recharged via an electrical connection while the vehicle is parked.

SUMMARY

Example embodiments of the present invention provide a system for the inductive charging of an energy accumulator of a vehicle, and a charging station, the system being usable reliably in different climatic zones.

Among features of example embodiments of the present invention with respect to the system for the inductive charging of an energy accumulator of a vehicle are that an electronic circuit is provided in the interior of a hood, the opening of which is situated at the bottom side of the hood.

This offers the advantage of forming a protection against water or other liquids appearing on the ground. In particular, protection is provided against high water level or water penetrating into the ground enclosure, since the hood overhangs the electronic circuit so far downward, e.g., in the gravitational direction, that even in the event the ground enclosure is completely filled, the water pressure is not great enough to allow the liquid surface to rise within the hood to the extent that the electronic circuit comes in contact with the fluid.

The protection is attainable in passive manner by the use of the hood. In this context, it is especially significant that the protection requires only the presence of an airtight and preferably fluid-tight or watertight hood.

Moreover, the charging is able to be accomplished without an electrical connection, thus increasing the safety. The reason is that by using the contactless implementation, an electric plug-in connection between the vehicle and a stationary circuit is also prevented from coming to lie under water. The circuit disposed in stationary fashion in the ground is able to be provided safely, especially also with fault-current monitoring and appropriate shutoff.

The electronic circuit may be disposed on the inside wall of the top side of the hood. The advantage in so doing is that the best possible protection against water rising in the hood is thereby attainable.

The electronic circuit may be supplied with electrical energy from one supply line, in particular, the supply line being provided in looped-through fashion, thus, the electronic circuit being supplied from a T-node. This has the advantage that watertight cables are able to be used, and because of the loop-through, a plurality of systems are able to be supplied in parallel, e.g., are able to be supplied from one voltage source. Consequently, the public grid is usable as supply source. Alternatively, a parallel supply of all electronic circuits of the systems of a charging station is also possible, preferably one current source for the supply then being advantageous. In this case, a T-node would then be dispensable.

The hood may be mounted on the bottom side of a cover, especially a cover plate. This offers the advantage that the hood, together with the electronic circuit, is accessible, and therefore maintainable, reparable or exchangeable by removing the cover from the remaining ground enclosure, especially the housing part of the system.

The cover may have a ferrite plate and a primary winding provided on the ferrite plate. This is advantageous in that the inductive coupling to the secondary coil of the consumer is improved, since the magnetic leakage flux is reduced.

The electronic circuit may impress an alternating current upon the primary winding, particularly an alternating current having a frequency between 10 and 500 kHz, especially between 20 and 30 kHz. This is advantageous because high wattages are transmittable, particularly several kilowatts, on small volume, especially from the ground to an ordinary automobile, the secondary coil being disposed at the floor of the vehicle within the vehicle floor area bounded by the wheels. Thus, a high power is transmittable in contactless manner in a simple manner in a compact spatial area. In addition, only ordinary power semiconductors, which are available as a mass-produced product, are needed to generate the alternating current.

The vehicle may have a secondary winding to which a capacitor of such kind is connected in series or in parallel such that the associated resonant frequency corresponds substantially to the frequency of the alternating current impressed upon primary winding 2. This offers the advantage that even in the event the secondary coil deviates from its optimal position relative to the primary winding or in the case of any other weak coupling, high efficiency is attainable in the transmission.

The cover may be implemented in a manner allowing it to be driven over by a vehicle. This is advantageous, because the system is thus able to be provided in streets or parking lots.

The cover is placeable upon and joinable to a housing part that has at least one lateral opening for the feed-through of a power supply cable. This offers the advantage that the cable is able to be run in the ground in protected fashion, namely, within the protective conduit.

The power supply cable may be carried outside of the housing part in a conduit that extends through the opening in the housing part. The advantage in this case is that the cable is routed into the protected interior of the housing part.

The hood may be implemented so as to be tight, especially airtight. This is advantageous because air is unable to escape, and thus the air pressure is unable to decrease, as well.

The cover may have a support member, in particular, a plate made of aluminum or steel, to whose bottom side the hood is secured, and on whose top side, the ferrite plate is disposed, the primary winding being situated on the top side of the ferrite plate. The advantage in this context is that stability is able to be improved and the ferrite plate has a stable base.

The cover may be mounted on the housing part with the aid of a hinge joint. This has the advantage that the electronic circuit is able to be made accessible by simply swinging the cover open on its hinge.

Among features in the case of the charging station having a plurality of systems are that the systems are supplied with energy in parallel from a public supply network via the supply line. This offers the advantage that one voltage source is usable, in particular, a low-frequency three-phase voltage source.

Next adjacent housing parts may be connected by a respective conduit for the feed-through of the power supply cable, in particular, at its first axial end area, the respective conduit being routed through an opening in a first housing part, and at its second axial end area, through an opening in a second housing part. The advantage in this case is that a protected underground connection is able to be formed.

The cover may have a support member, particularly a plate made of plastic, on the bottom side of which the ferrite plate is disposed, the primary winding being situated on the top side of the ferrite plate, so that the primary winding is positioned between the plastic plate and the ferrite plate, the primary winding being surrounded by potting compound, especially cured potting compound,
the side wall, particularly the hood, being joined to the support member, the potting compound and/or the ferrite plate,
in particular, the ferrite plate having a multi-piece construction. This is advantageous, because the support member is made of plastic, and therefore the inductive coupling between the primary winding and the secondary winding is unimpaired, or at least is almost unimpaired. In addition, the plastic plate is stabilized by the cured potting compound at the bottom side of the plastic plate, and thus is able to be driven over by the vehicle. Moreover, the potting compound fulfills the retaining function for the ferrite plate and the primary conductor, as well. In addition, the hood is secured to the cover from below, e.g., to the side of the ferrite plate facing away from the primary winding. An at least additional integral joining of the hood with the potting compound is even able to be produced, and thus airtightness is able to be effected at this connection. In addition, a screw connection may be provided between the hood part and the cover.

Further and aspects of example embodiments of the present invention are described in more detail below with reference to the appended Figures.

DETAILED DESCRIPTION

Figure 1:
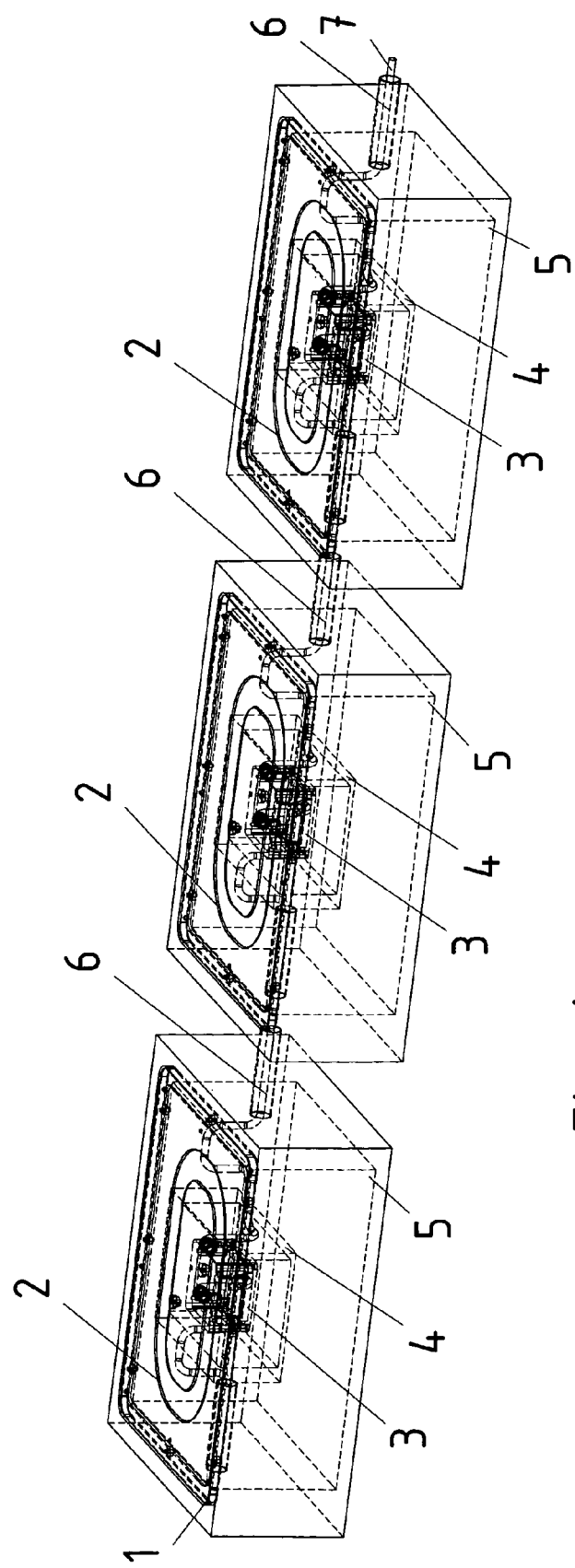
FIG. 1 illustrates three ground enclosures being provided in series.
Figure 2:
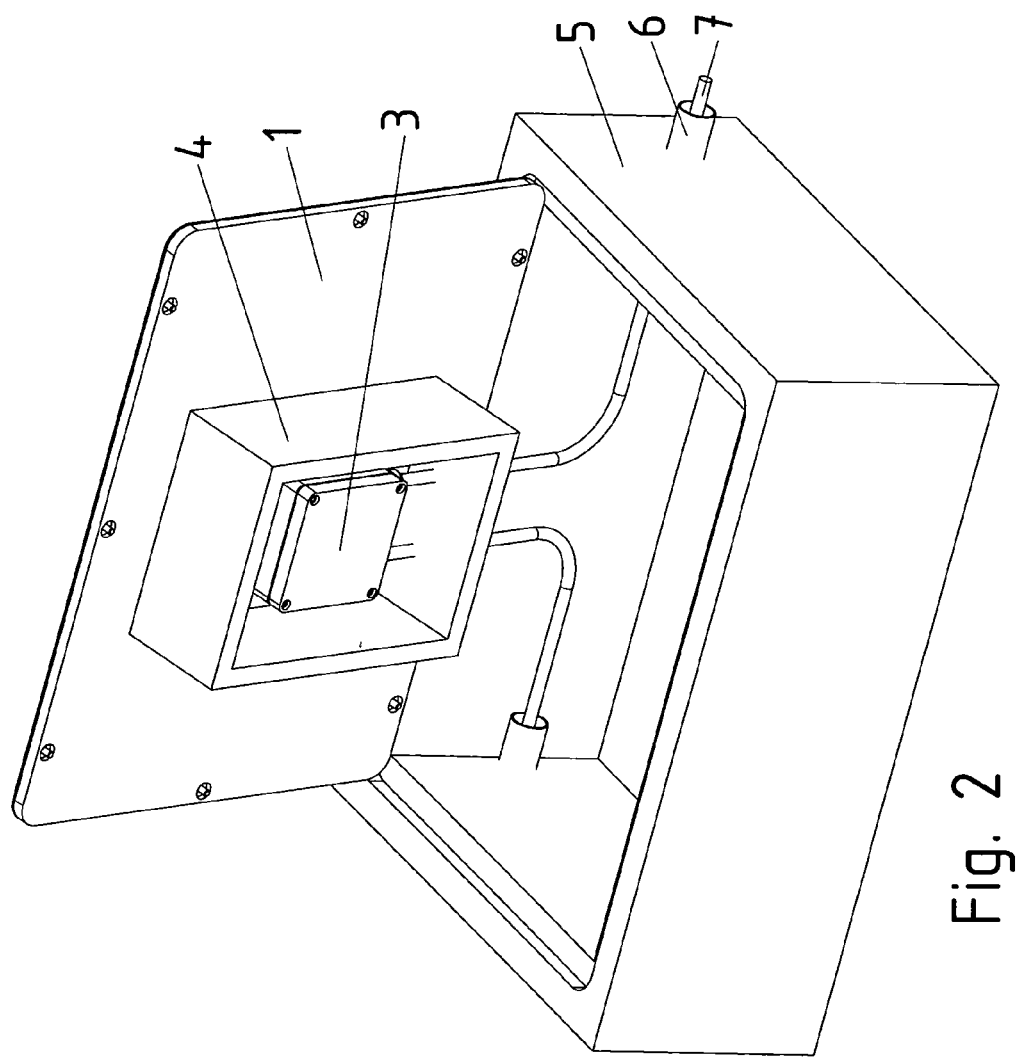
FIG. 2 shows an oblique view of a ground enclosure with cover 1 swung open.
Figure 3:
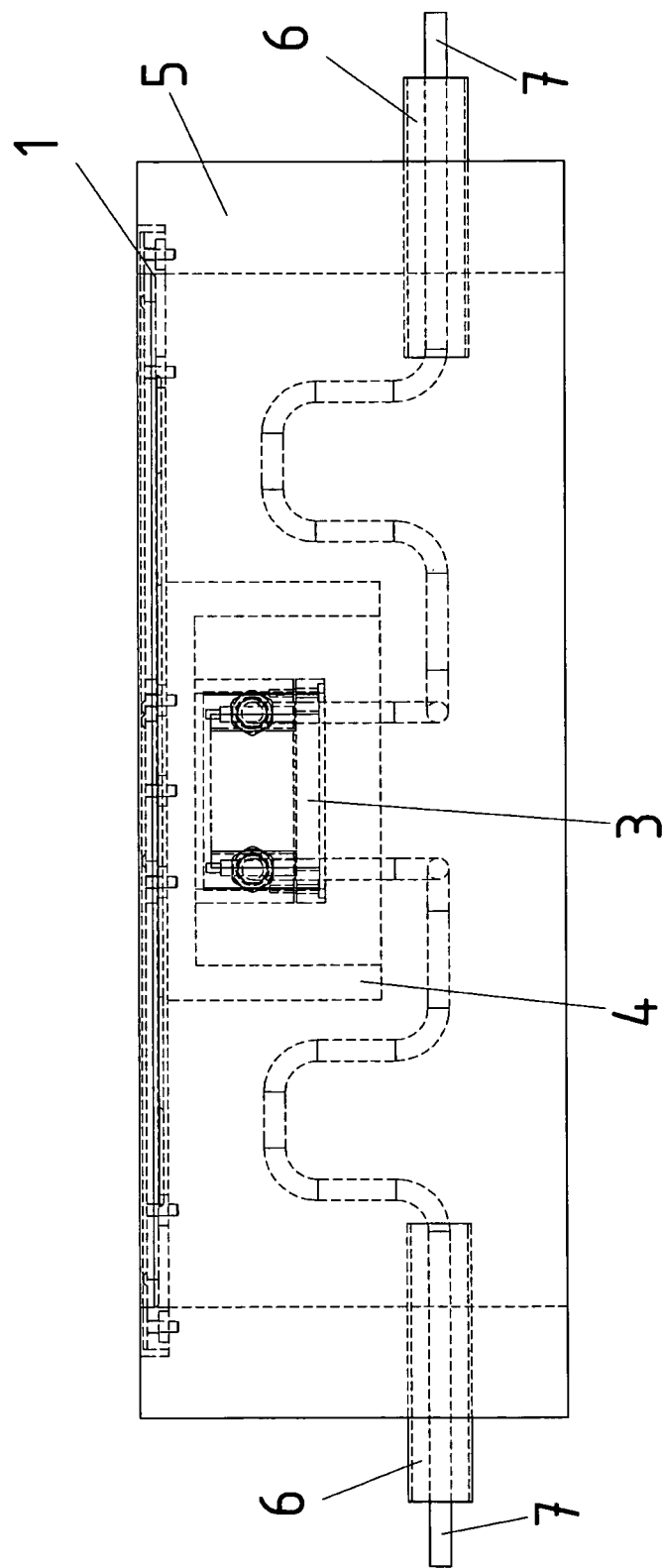
FIG. 3 shows a lateral phantom view of the ground enclosure.
Figure 4:
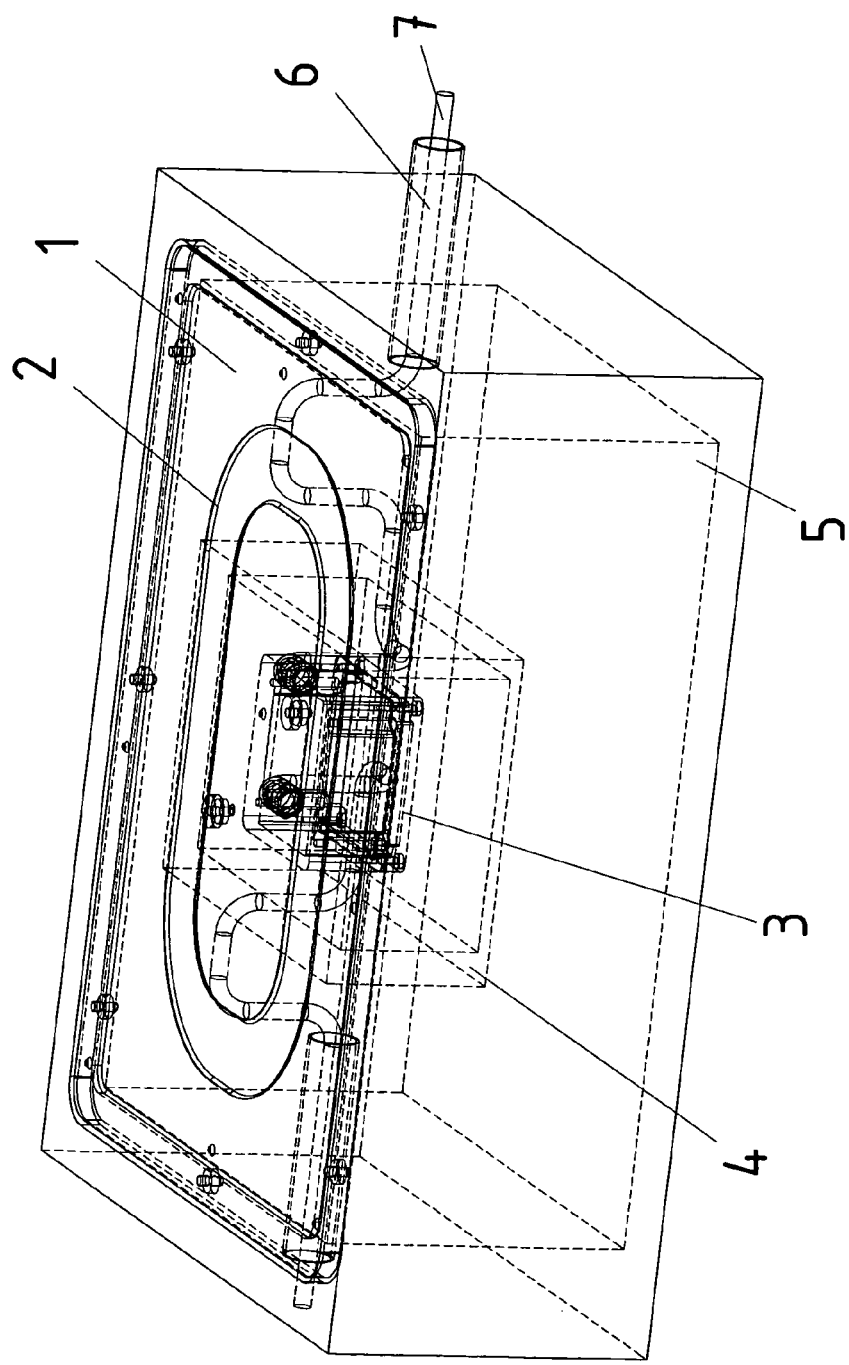
FIG. 4 shows a spatial phantom view of the ground enclosure.

The ground enclosure has a housing part 5, which is closable by a cover 1.

Housing part 5 is formed of four side walls and has no top part and no bottom part. This allows fluid which has penetrated to drain away downward, e.g., allows ingressed fluid to seep out.

The ground enclosure is disposed in series, e.g., in parking lots. In so doing, it is disposed so deep in the ground that it is able to be driven over by a vehicle such as an automobile. In addition, the ground enclosure is also constructed with suitable strength allowing it to be driven over. In particular, it is able to be placed in the middle of a parking space, so that the wheels of the vehicle are able to be positioned laterally set apart, and cover 1 thus comes to lie directly under the vehicle floor.

Cover 1 includes a primary winding 2, implemented as a ring winding, which is placed on a ferrite plate. Preferably, the winding is encapsulated and/or is disposed underneath a plastic plate. Thus, primary winding 2 is provided in protected fashion. The ferrite plate is disposed on the side of primary winding 2 facing away from the vehicle.

Cover 1 is screw-connected to housing part 5. Alternatively, it is able to be swung open with the aid of a hinge joint provided on housing part 5.

On the bottom side of cover 1, an electronic circuit 3 is disposed in a hood 4, so that in the event fluid has ingressed into the housing part, it cannot rise to electronic circuit 3, since hood 4 is joined in airtight manner to cover 1, and therefore the rising fluid is pushed back by air. Only if the pressure in the fluid increases to very high values, can the fluid level rise to such an extent that the electronic circuit comes in contact with the fluid. Rain water occurring at the parking space does not reach these high pressure values—even if it were to flow into the ground enclosure and would not seep away into the subsoil, thus, at the bottom side of the ground enclosure, and therefore little by little, would completely fill the ground enclosure.

The side wall of hood 4 is at least twice as long In the gravitational direction as the length of electronic circuit 3 in this direction. Consequently, a pressure in the fluid of at least approximately 1 bar is necessary to compress the air in hood 4 to such an extent that the fluid level could wetten electronic circuit 3. An increase in the critical pressure is attainable by corresponding extension of the hood length in the gravitational direction.

A power supply cable 7 is routed by a protective underground conduit 6 through an opening in housing part 5, and supplies electronic circuit 3 with electrical energy. Preferably, the power supply cable carries three-phase current lines. Alternatively, power supply cable 7 carries only one single-phase alternating current line.

Electronic circuit 3 has a rectifier, whose rectified voltage supplies an inverter that generates a single-phase alternating voltage which has a frequency between 10 and 500 kHz, preferably a frequency between 20 and 30 kHz. From this alternating voltage, a gyrator is supplied whose resonant frequency corresponds substantially to the frequency, and which thus represents a current source on the output side.

An alternating current is impressed upon primary winding 2 with the aid of the alternating-current source thus formed.

The vehicle has a secondary winding to which a capacitor of a kind is connected in series or in parallel such that the associated resonant frequency corresponds substantially to the frequency of the alternating current impressed upon primary winding 2. Consequently, even if the positioning of the vehicle is not optimal, e.g., in the event of an impaired inductive coupling between primary winding 2 and a secondary winding, an adequate efficiency factor is attainable during the contactless inductive energy transfer to the vehicle.

In the vehicle, the transmitted electrical energy is used to charge an energy accumulator.

Supply line 7 is provided in looped-through fashion. Therefore, electronic circuits 3 of the ground enclosures disposed one after the other in series are able to be supplied in parallel. To that end, a T-node is thus implemented within each hood 4.

In an alternative exemplary embodiment, instead of this supply in parallel, a supply in series is implemented.

In preparing the parking lot, depressions are introduced into the ground, into which in each case, a housing part 5 is inserted. In addition, between housing parts 5, the conduits are inserted through which supply lines 7 are able to be routed in protected fashion. After installing the cabling and mounting prefabricated cover 1, provided with hood 4 and electronic circuit 3, on respective housing part 5, the subsoil is filled in and the ground surface, able to be driven over, is prepared.

LIST OF REFERENCE NUMERALS

1. Cover
2. Primary winding
3. Electronic circuit
4. Hood
5. Housing part
6. Conduit
7. Supply line

What is claimed is:

1. A system for inductively charging an energy accumulator of a vehicle, comprising:
   a housing having at least one downwardly depending first wall forming a top opening and a bottom opening, a cavity being formed in the housing bounded by the at least one first wall;
   a cover coupled to a top surface of the housing to cover the top opening, the cover including at least one downwardly depending second wall located in the cavity when the cover covers the top surface of the housing, a top of the at least one second wall depending from a bottom surface of the cover, and an interface between the top of the at least one second wall and the bottom surface of the cover being fluid tight to form a hood having an opening at a bottom;
   an electronic circuit arranged in an interior of the hood, the electronic circuit adapted to inductively charge the energy accumulator of the vehicle; and
   at least one supply cable connected to the electronic circuit and passing through the at least one second wall in a fluid tight manner.

2. The system of claim 1, wherein the housing is a rectangular housing.

3. The system of claim 1, wherein the at least one downwardly depending first wall includes at least three downwardly depending first walls.

4. The system of claim 1, wherein the at least one downwardly depending second wall includes at least three downwardly depending second walls.

5. The system of claim 4, wherein the at least three downwardly depending second walls form a rectangle.

6. The system of claim 1, wherein the cover is coupled to the top surface of the housing by a hinge.

7. The system of claim 1, wherein the cover is coupled to the top surface of the housing by at least one screw.

8. The system of claim 1, wherein a height of the at least one second wall is less than a height of the at least one first wall.

9. The system of claim 1, wherein a height of the electronic circuit does not exceed half of a height of the at least one second wall.

10. The system of claim 1, wherein the at least one supply cable is provided in a looped-through fashion, and the electronic circuit is suppliable from a T-node.

11. The system of claim 1, wherein the cover includes a primary winding.

12. The system of claim 11, wherein the electronic circuit is adapted to impress an alternating current on the primary winding.

13. The system of claim 12, wherein the alternating current has a frequency between 10 KHz and 500 KHz.

14. The system of claim 13, wherein the alternating current has a frequency between 20 KHz and 30 KHz.

15. The system of claim 11, wherein the cover includes a support member, and wherein the at least one second wall is in fluid tight communication with a bottom side of the support member.

16. The system of claim 15, wherein the support member is composed of metal.

17. The system of claim 15, wherein the support member is composed of plastic.

18. The system of claim 15, wherein the cover includes a ferrite plate whose bottom side is disposed on a top side of the support member, and wherein the primary winding is disposed on a top side of the ferrite plate.

19. The system of claim 1, wherein the at least one supply cable is connected to a further system for inductively charging a further energy accumulator of a further vehicle.

20. The system of claim 19, wherein the system and the further system are electrically connected in series.

21. The system of claim 18, wherein a potting compound is provided between the primary winding and the ferrite plate.

22. The system of claim 15, wherein the vehicle includes a secondary winding to which a capacitor is connected in series or in parallel such that an associated resonant frequency corresponds substantially to a frequency of the alternating current impressed upon the primary winding.

23. The system of claim 1, wherein the cover is adapted to be driven over by a vehicle.

24. The system of claim 1, wherein the cover has a support member and/or a plate made of plastic, on a bottom side of which a ferrite plate is disposed, a primary winding being situated on a top side of the ferrite plate, so that the primary winding is positioned between the ferrite plate and the support member and/or the plastic plate, the primary winding being surrounded by a potting compound and/or a cured potting compound, a side wall and/or the hood being joined to the support member, the plastic plate, the potting compound and/or the ferrite plate.

25. The system of claim 24, wherein the ferrite plate has a multi-piece construction.

26. A charging station, comprising:
   a plurality of systems recited in claim 1;
   wherein the systems are suppliable in parallel from a public supply network via a supply line.

* * * * *